US00RE41915E

(19) United States
(12) Reissued Patent
Haraguchi et al.

(10) Patent Number: US RE41,915 E
(45) Date of Reissued Patent: Nov. 9, 2010

(54) CHARGE/DISCHARGE CONTROL CIRCUIT AND SECONDARY BATTERY

(75) Inventors: Akira Haraguchi, Aichi (JP); Takashi Matsumoto, Aichi (JP)

(73) Assignee: Fujitsu Semiconductor Limited, Yokohama (JP)

(21) Appl. No.: 10/854,781

(22) Filed: May 27, 2004

Related U.S. Patent Documents

Reissue of:
(64) Patent No.: 6,396,246
Issued: May 28, 2002
Appl. No.: 09/816,108
Filed: Mar. 26, 2001

(30) Foreign Application Priority Data

Jun. 22, 2000 (JP) ..... 2000-187567

(51) Int. Cl.
*H01M 10/46* (2006.01)

(52) U.S. Cl. ..... 320/134; 320/136
(58) Field of Classification Search ..... 320/116, 320/127, 128, 134, 135, 136
See application file for complete search history.

(56) References Cited

U.S. PATENT DOCUMENTS 5,789,900 A * 8/1998 Hasegawa et al. ..... 320/132
5,896,025 A * 4/1999 Yamaguchi et al. ..... 320/134
6,060,864 A * 5/2000 Ito et al.
6,087,807 A * 7/2000 Sudo et al.
6,094,034 A * 7/2000 Matsuura

FOREIGN PATENT DOCUMENTS

| | | |
|---|---|---|
| JP | 05-064377 | 3/1993 |
| JP | 6-105458 | 4/1994 |
| JP | 7-326389 | * 12/1995 |
| JP | 10-014123 | 1/1998 |
| JP | 11-164489 | 6/1999 |
| JP | 11-215716 | * 8/1999 |
| JP | 2000-106220 | 4/2000 |
| JP | 2001-275271 | 10/2001 |

* cited by examiner

*Primary Examiner*—Edward Tso
(74) *Attorney, Agent, or Firm*—Arent Fox LLP

(57) ABSTRACT

A charge/discharge control circuit for controlling charging and discharging of a secondary battery that includes a cell. The charge/discharge control circuit includes an overdischarge detection circuit for detecting an overdischarged state of the battery, and an overcharge detection circuit for detecting an overcharged state of the battery. A discharge control switch is deactivated in the overdischarged state. A first charge control switch is deactivated in the overdischarged state. A second charge control switch is activated in the overdischarged state. A current-limiting circuit is connected in series with the second charge control switch for limiting the charging current when charging is performed.

26 Claims, 4 Drawing Sheets

CHARGE/DISCHARGE CONTROL CIRCUIT AND SECONDARY BATTERY

Matter enclosed in heavy brackets [ ] appears in the original patent but forms no part of this reissue specification; matter printed in italics indicates the additions made by reissue.

BACKGROUND OF THE INVENTION

The present invention relates to a charge/discharge control circuit, and more particularly, to a charge/discharge control circuit of a secondary battery used in a portable electronic device.

Enhanced performance of contemporary portable electronic devices (e.g., personal computers) has created a demand for batteries having prolonged lifetime. Lithium ion batteries, which are commonly used as secondary batteries, are widely used in recent portable electronic devices. To prolong the lifetime of a lithium ion battery, charging and discharging of the battery has to be controlled. During discharge control, discharging is prohibited when the battery is overdischarged. During charge control, charging is prohibited when the battery is overcharged.

FIG. 1 is a schematic circuit diagram of a prior art charge/discharge control circuit 50. The charge/discharge control circuit 50 includes a control unit 3 and two control switches that are externally connected to the control unit 3. The two control switches are a discharge control switch 4 and a charge control switch 5a. The charge/discharge control circuit 50 controls the charge/discharge control current of a battery 1. The battery 1 is a lithium ion battery that can be used as a secondary battery, and includes three series-connected cells 2a, 2b, 2c. The battery 1 provides power to a portable electronic device, for instance.

The discharge control switch 4 and the charge control switch 5a each include a p-channel MOS transistor. Each p-channel MOS transistor includes a parasitic diode formed between its source and drain. The drain of the discharge control switch 4 is connected to the drain of the charge control switch 5a.

The positive terminal of the battery 1 is connected to an output terminal t1 via the control switches 4, 5a. The negative terminal of the battery 1 is connected to the ground GND and an output terminal t2.

The charge control switch 5a is controlled based on a charge control signal Cout of the control unit 3. The discharge control switch 4 is controlled based on a discharge control signal Dout of the control unit 3.

The cells 2a, 2b, 2c of the battery 1 are each connected to a cell voltage detection circuit 6 incorporated in the control unit 3. The cell voltage detection circuit 6 includes three comparators 7a, 7b, 7c. The comparator 7a detects voltage V2a between terminal BH and terminal BM. The comparator 7b detects voltage V2b between terminal BM and terminal BL. The comparator 7c detects voltage V2c between terminal BL and the GND terminal.

The output signals of the comparators 7a, 7b, 7c are each provided to positive input terminals of an overcharge detection circuit 8 and to negative input terminals of an overdischarge detection circuit 9. A charge reference voltage VTH is provided to a negative input terminal of the overcharge detection circuit 8. A discharge reference voltage VTL is provided to a positive input terminal of the overdischarge detection circuit 9.

The overdischarge detection circuit 9 provides the discharge control signal Dout to the gate of the discharge control switch 4. The overcharge detection circuit 8 provides the charge control signal Cout to the gate of the charge control switch 5a.

The control unit 3 includes a bias generation circuit 10. When the battery 1 supplies the bias generation circuit 10 with power supply voltage Vcc, the control unit 3 is activated.

When any one of the cell voltages V2a, V2b, V2c is higher than the charge reference voltage VTH, that is, in an overcharged state, the charge control signal Cout is high and the discharge control signal Dout is low. Thus, the discharge control switch 4 is activated and the charge control switch 5a is deactivated. Accordingly, charging is prohibited.

In this state, a discharge route, which includes the parasitic diode of the discharge control switch 5a, the discharge control switch 4, and the battery 1, is formed between the output terminals t1, t2. Accordingly, if a portable electronic device is connected between the output terminals t1, t2, the battery 1 provides a current to the portable electronic device. This lowers each cell voltage.

When all of the cell voltages V2a, V2b, V2c are included between the charge reference voltage VTH and the discharge reference voltage VTL, that is, in a normal state, the charge control signal Cout and the discharge control signal Dout are both low. This activates both of the control switches 4, 5a and enables charging and discharging of each cell.

When charging the battery 1, constant current charging is performed. Since the charging voltage is significantly greater than the threshold voltage of the charge control switch 5a, the ON resistance of the charge control switch 5a is small. In contrast to constant voltage charging, the current value in constant current charging is greater. However, the ON resistance of the discharge control switch 5a is smaller. Thus, the voltage between the source and drain of the switch 5a is lower. As a result, the power consumption in the charge control switch 5a decreases and the charge control switch 5a is not heated.

When any one of the cell voltages V2a, V2b, V2c is lower than the discharge reference voltage VTL, that is, in an overdischarged state, the charge control signal Cout is low and the discharge control signal Dout is high. This activates the charge control switch 5a and deactivates the discharge control switch 4. Accordingly, discharging is prohibited.

In this state, the parasitic diode of the discharge control switch 4 forms a charge route between the output terminals t1, t2. This enables charging. If a charger is then connected between the output terminals t1, t2 and charges the battery 1, which is in an overdischarged state, the cell voltages increase. This provides power to the portable electronic device.

If the battery 1 is charged when any one of the cells 2a, 2b, 2c is in an overdischarged state, the charge/discharge control circuit 50 performs constant current charging. In the prior art, when a lithium ion battery is charged, constant current charging is performed if the power supply voltage Vcc is low. When the power supply voltage Vcc becomes equal to a predetermined voltage (e.g., 12.6V), constant current charging is switched to constant voltage charging. This is because constant current charging charges the battery more quickly, since the charging current in constant current charging is greater than that in constant voltage charging.

When constant current charging is performed in an overdischarged state, such as when the level of the power supply voltage Vcc is extremely low (e.g., Vcc≈0), the charging voltage becomes low in comparison to normal constant current charging. During constant voltage charging, the charging voltage of a typical charger is set at 12.6V. However, during constant current charging, the charging voltage is controlled in accordance with the level of the power supply voltage Vcc.

Thus, when the discharge reference voltage VTL of the overdischarge detection circuit 9 is 2.5V and the cell voltages V2a, V2b, V2c are each 3V (normal state), the power supply voltage Vcc is 9V. In this state, the charging voltage is significantly greater than the threshold voltage of the charge control switch 5a, which is typically 4V.

When the level of the power supply voltage Vcc decreases to a value close to 0V (overdischarged state), the charging voltage decreases to 4V and becomes equal to the minimum voltage between the source and gate of the charge control switch 5a that enables activation of the charge control switch 5a. In this state, the ON resistance of the charge control switch 5a is large. Thus, if the voltage drop at the parasitic diode of the discharge control switch 4 is 1V, the voltage between the source and drain of the charge control switch 5a is 3V.

When the charging current is 1 A, the power consumption of the charge control switch 5a is 3 W and thus large. Hence, in the charge/discharge control circuit 50, the charge control switch 5a is heated when the battery 1 is charged in an overdischarged state, due to a large power consumption in the charge control switch 5a.

SUMMARY OF THE INVENTION

It is an object of the present invention to provide a charge/discharge control circuit that decreases the power consumed by a charge control switch when a secondary battery is charged in an overdischarged state.

To achieve the above object, the present invention provides a charge/discharge control circuit for controlling charging and discharging of a secondary battery. The secondary battery includes a cell. The charge/discharge control circuit includes an overdischarge detection circuit for comparing a voltage of the cell with a predetermined discharge reference voltage, determining whether the secondary battery is in an overdischarged state, and generating an overdischarge determination signal. There is also an overcharge detection circuit for comparing the voltage of the cell with a predetermined charge reference voltage, determining whether the secondary battery is in an overcharged state, and generating an overcharge determination signal. A discharge control switch is connected to the overdischarge detection circuit and deactivated in the overdischarged state based on the overdischarge determination signal. A first charge control switch is deactivated in the overdischarged state based on the overdischarge determination signal and the overcharge determination signal. A second charge control switch is activated in the overdischarged state based on the overdischarge determination signal and the overcharge determination signal. A current-limiting circuit is connected in series with the second charge control switch for limiting a charging current when charging is performed.

The present invention also provides an alternative charge/discharge control circuit for controlling charging and discharging of a secondary battery. The secondary battery includes a cell. The charge/discharge control circuit includes an overdischarge detection circuit for comparing a voltage of the cell with a predetermined discharge reference voltage, determining whether the secondary battery is in an overdischarged state, and generating an overdischarge determination signal. There is also an overcharge detection circuit for comparing the voltage of the cell with a predetermined charge reference voltage, determining whether the secondary battery is in an overcharged state, and generating an overcharge determination signal. A discharge control switch is connected to the overdischarge detection circuit and deactivated in the overdischarged state based on the overdischarge determination signal. A first charge control switch is deactivated in the overdischarged state based on the overdischarge determination signal and the overcharge determination signal. A second charge control switch is activated in the overdischarged state based on the overdischarge determination signal and the overcharge determination signal. A current-limiting circuit is connected in series with the second charge control switch for limiting a charging current when charging is performed. Furthermore, an erroneous functioning prevention circuit controls activation and deactivation of the first charge control switch in the overdischarged state based on a level of a voltage supplied by the secondary battery.

The present invention further provides a secondary battery including a cell and a charge/discharge control circuit connected to the cell for controlling charging and discharging of the cell. The charge/discharge control circuit includes an overdischarge detection circuit for comparing a voltage of the cell with a predetermined discharge reference voltage, determining whether the secondary battery is in an overdischarged state, and generating an overdischarge determination signal. There is also an overdischarge detection circuit for comparing the voltage of the cell with a predetermined charge reference voltage, determining whether the secondary battery is in an overcharged state, and generating an overcharge determination signal. A discharge control switch is connected to the overdischarge detection circuit and deactivated in the overdischarged state based on the overdischarge determination signal. A first charge control switch is deactivated in the overdischarged state based on the overdischarge determination signal and the overcharge determination signal. A second charge control switch is activated in the overdischarged state based on the overdischarge determination signal and the overcharge determination signal. A current-limiting circuit is connected in series with the second charge control switch for limiting a charging current when charging is performed.

Other aspects and advantages of the present invention will become apparent from the following description taken in conjunction with the accompanying drawings, illustrating by way of example the principle of the present invention.

BRIEF DESCRIPTION OF THE DRAWINGS

The invention, together with objects and advantages thereof, may best be understood by reference to the description of the following exemplary embodiments together with the accompanying drawings in which.

DETAILED DESCRIPTION OF THE PREFERRED EMBODIMENTS

[First Embodiment]

Figure 1:
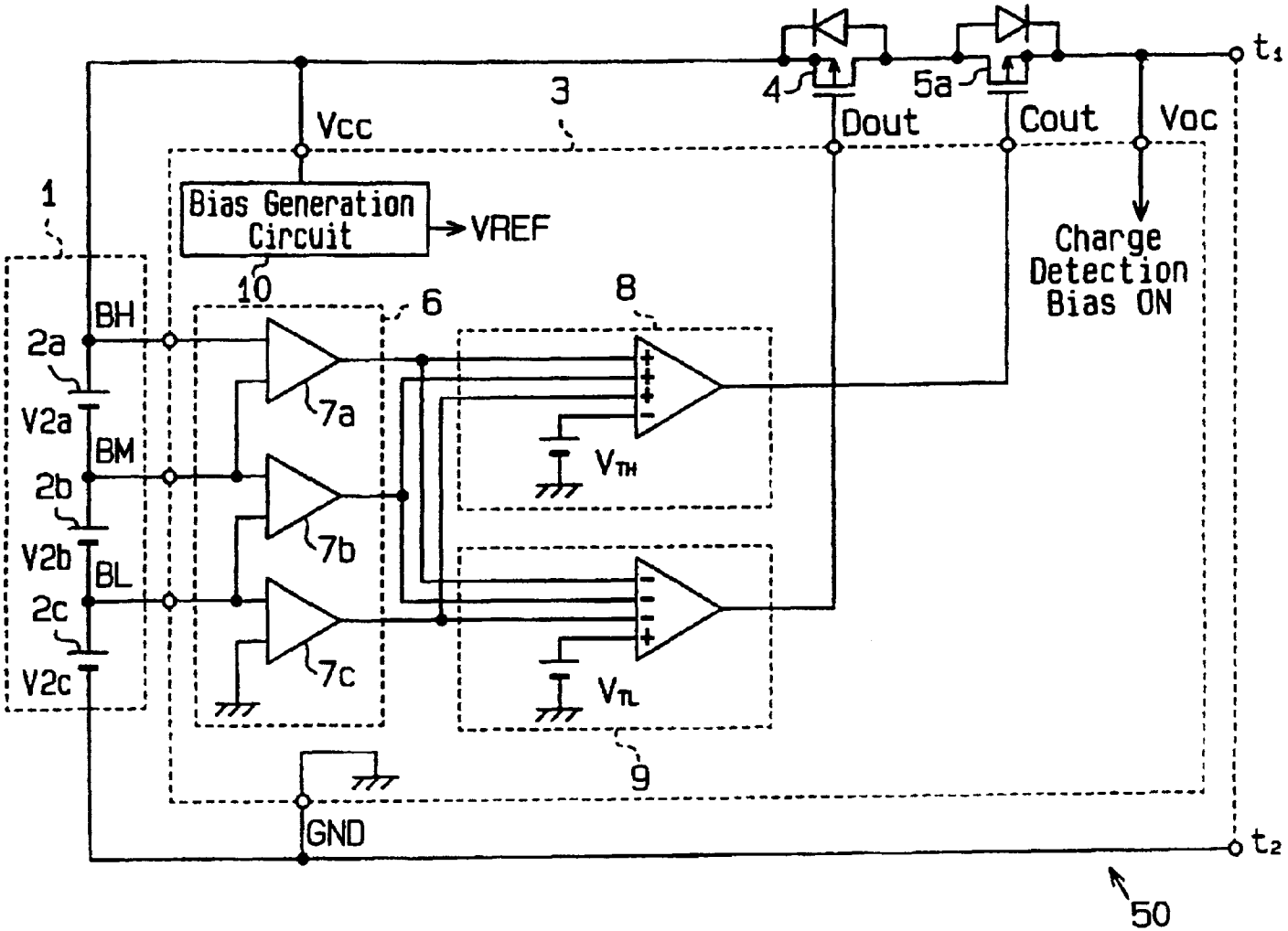
Fig.1 (Prior Art)
FIG. 1 is a schematic circuit diagram of a prior art charge/discharge control circuit.
Figure 2:
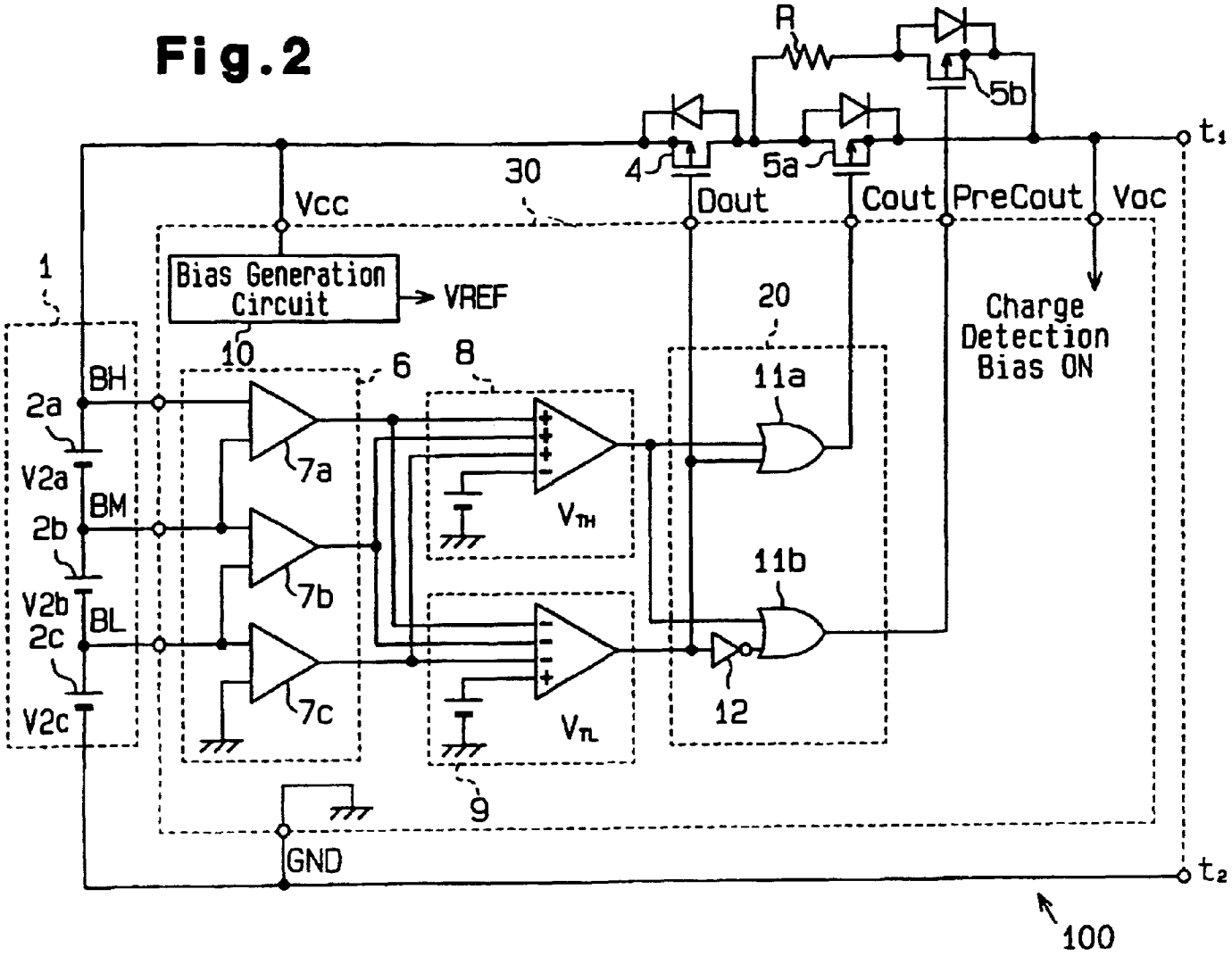
FIG. 2 is a schematic circuit diagram of a charge/discharge control circuit according to a first embodiment of the present invention.

FIG. 2 is a schematic circuit diagram of a charge/discharge control circuit 100 according to a first embodiment of the present invention. The charge/discharge control circuit 100 includes a control unit 30, a discharge control switch 4, and a first charge control switch 5a. The discharge and charge control switches 4, 5a are connected to the control unit 30. The control unit 30 further includes a cell voltage detection circuit 6, an overcharge detection circuit 8, and an overdischarge detection circuit 9.

The charge/discharge control circuit 100 further includes a second charge control switch 5b, a resistor R, and an output circuit 20. The output circuit 20 includes a first OR circuit 11a, a second OR circuit 11b, and an inverter 12.

The second charge control switch 5b and the resistor R are connected in series. The first charge control switch 5a is connected in parallel with the series-connected switch 5b and resistor R. The resistor R is a current-limiting resistor. The second charge control switch 5b is preferably a p-channel MOS transistor.

A parasitic diode is formed between the source and drain of the second charge control switch 5b. The cathode of the parasitic diode is connected to the source of the switch 5b.

Constant voltage charging is performed by the second discharge control switch 5b. When a charging current flows through the second charge control switch 5b, the voltage drop across the resistance R increases the charging voltage to a predetermined target charging voltage.

The resistance of the resistor R is set such that the voltage drop across the resistor R is greater than the target charging voltage.

The output signal of the overcharge detection circuit 8 is provided to first input terminals of the first and second OR circuits 11a, 11b respectively. The output signal (discharge control signal) Dout of the overdischarge detection circuit 9 is provided to the gate of the discharge control switch 4 and a second input terminal of the first OR circuit 11a. The discharge control signal Dout is also provided to a second input terminal of the second OR circuit 11b via the inverter 12.

The output signal (first charge control signal) Cout of the first OR circuit 11a is provided to the gate of the first charge control switch 5a. The output signal (second charge control signal) PreCout of the second OR circuit 11b is provided to the gate of the second charge control switch 5b. Accordingly, when the first charge control signal Dout is high and the output signal of the overcharge detection circuit 8 is low, the second charge control signal PreCout is low. In this state, the second charge control switch 5b is activated.

The operation of the charge/discharge control circuit 100 will now be discussed. The cell voltage detection circuit 6 detects cell voltages V2a, V2b, V2c and provides the respective detection signals to the overcharge detection circuit 8 and the overdischarge detection circuit 9.

When any one of the cell voltages V2a, V2b, V2c exceeds the charge reference voltage VTH of the overcharge detection circuit 8 (overcharged state), the output signal of the overcharge detection circuit 8 goes high. The overcharge detection circuit 8 provides the high output signal to the first and second OR circuits 11a, 11b. In this state, the discharge control signal Dout is low and the discharge control switch 4 is activated.

The low discharge control signal Dout is also provided to first OR circuit 11a and the inverter 12. The inverter 12 inverts the discharge control signal Dout and provides a high signal Dout to the second OR circuit 11b.

Since the first and second charge control signals Cout, PreCout are both high in this state, the first and second charge control switches 5a, 5b are both deactivated. This prohibits charging.

In this state, if a portable electronic device is connected between output terminals t1, t2, the battery 1 supplies the portable electronic device with a discharging current via the discharge control switch 4 and the parasitic diode of the charge control switch 5a.

As discharging proceeds and the power supply voltage Vcc decreases, all of the cell voltages V2a, V2b, V2c become included between the charge reference voltage VTH and the discharge reference voltage VTL (normal state). In this state, the output signals of the overcharge detection circuit 8 and the overdischarge detection circuit 9 go low. Accordingly, the discharge control signal Dout goes low and the discharge control switch 4 is activated.

The first charge control signal Cout generated by the first OR circuit 11a also goes low and hence the first charge control switch 5a is activated. The second charge control signal PreCout generated by the second OR circuit 11b goes high and hence the second charge control switch 5b is deactivated.

In this state, if a charger is connected between the output terminals t1, t2, the charger supplies the battery 1 with a charging current via the first charge control switch 5a and the discharge control switch 4 so to perform constant current charging. If, for example, the discharge reference voltage VTL is 2.5V and each of the cell voltages V2a, V2b, V2c is 3V, the power supply voltage Vcc is 9V. Further, the charging voltage for performing constant current charging in the normal state is about 10V, which is slightly higher than the power supply voltage. The threshold voltage of the first charge control switch 5a is about 4V.

Since the voltage between the source and gate of the first charge control switch 5a is 10V and significantly greater than the threshold voltage of the first charge control switch 5a (which is 4V), the ON resistance of the first charge control switch 5a is small. This low voltage between the source and drain of the first charge control switch 5a reduces the power consumption of the first charge control switch 5a. Thus, charging is performed without heating the first charge control switch 5a.

If the target charging voltage is, for example, 12.6V, and constant current charging increases the battery voltage Vcc to the target charging voltage of 12.6V, the constant current charging is switched to constant voltage charging.

When any one of the cell voltages V2a, V2b, V2c becomes lower than the discharge reference voltage VTL (overdischarged state), the discharge control signal Dout goes high. This high discharge control signal Dout deactivates the discharge control switch 4, and prohibits discharging. Further, the first charge control signal Cout generated by the first OR circuit 11a goes high and the first charge control switch 5a is deactivated.

Additionally, the second charge control signal PreCout generated by the second OR circuit 11a goes low and the second charge control switch 5b is activated. In this state, a conductive route is formed between the output terminals t1, t2 by way of the second charge control switch 5b, the resistor R, the parasitic diode of the discharge control switch 4, and the battery 1. The battery 1 is charged when the charger is connected between the output terminals t1, t2.

In the charge/discharge circuit 100, if the battery voltage Vcc in the overdischarged state decreases to a value close to 0V and the charging voltage is low, a voltage drop occurs across the resistor R when a charging current flows through the second charge control switch 5b. This immediately increases the charging voltage to the target charging voltage of 12.6V.

Accordingly, the charge/discharge control circuit 100 performs constant voltage charging (12.6V) in the overdischarged state. During the constant voltage charging, the voltage between the source and gate of the second charge control switch 5b is substantially equal to the target charging voltage of 12.6V and significantly higher than the threshold voltage of the second charge control switch 5b, which is 4V.

Therefore, the ON resistance of the second charge control switch 5b is small, and the voltage between the source and drain of the second charge control switch 5b is small. This reduces the power consumption in the second charge control switch 5b and enables charging to be performed without heating the second charge control switch 5b.

The charging increases the voltages of the cells from being in the overdischarged state until each of cell voltage V2a, V2b, V2c exceeds the discharge reference voltage VTL. This causes the output signals of the overcharge detection circuit 8 and the overdischarge detection circuit 9 to go low. As a result, the discharge control switch 4 and the first charge control switch 5a are both activated and the second charge control switch 5b is deactivated, so to perform constant current charging.

The charge/discharge circuit 100 of the first embodiment has the advantages described as follows.

(1) If the battery 1 is charged when any of the cells 2a, 2b, 2c is in an overdischarged state, the charging current flows through the resistor R via the second charge control switch 5b. Thus, even if the power supply (battery) voltage Vcc is decreased to a value close to 0V, the voltage drop across the resistor R immediately increases the charging voltage to the target charging voltage of 12.6V. By performing the constant voltage charging at 12.6V, the power consumption in the second charge control switch 5b decreases and charging is performed without heating the second charge control switch 5b.

(2) The voltage drop across the resistor R is set such that it is greater than the target charging voltage of 12.6V. In other words, during constant voltage charging, the charging current flowing through the second charge control switch 5b is restricted to a value that is smaller than the current value during constant current charging. Accordingly, charging is performed without heating the second charge control switch 5b.

(3) Since the circuit including the second charge control switch 5b and the resistor R is connected in parallel with the first charge control switch 5a, an overdischarged battery 1 and a normal-state battery 1 are charged by way of different control switches. This prevents the control switches from being heated during charging the battery 1 in either the overdischarged or normal state.

(4) When the voltages of the three series-connected cells in the battery 1 are imbalanced, the first and second charge control switches 5a, 5b are both deactivated so to prohibit further charging. An imbalanced state refers to a state in which one of the three cells is overdischarged and the remaining one or two cells are overcharged, for instance.

(5) The charge/discharge circuit 100 allows the battery 1 to be charged without heating the control switches. This simplifies the configuration of an external charging circuit that is to be used for charging the battery 1, and decreases the number of components in the system.

[Second Embodiment]

Figure 3:
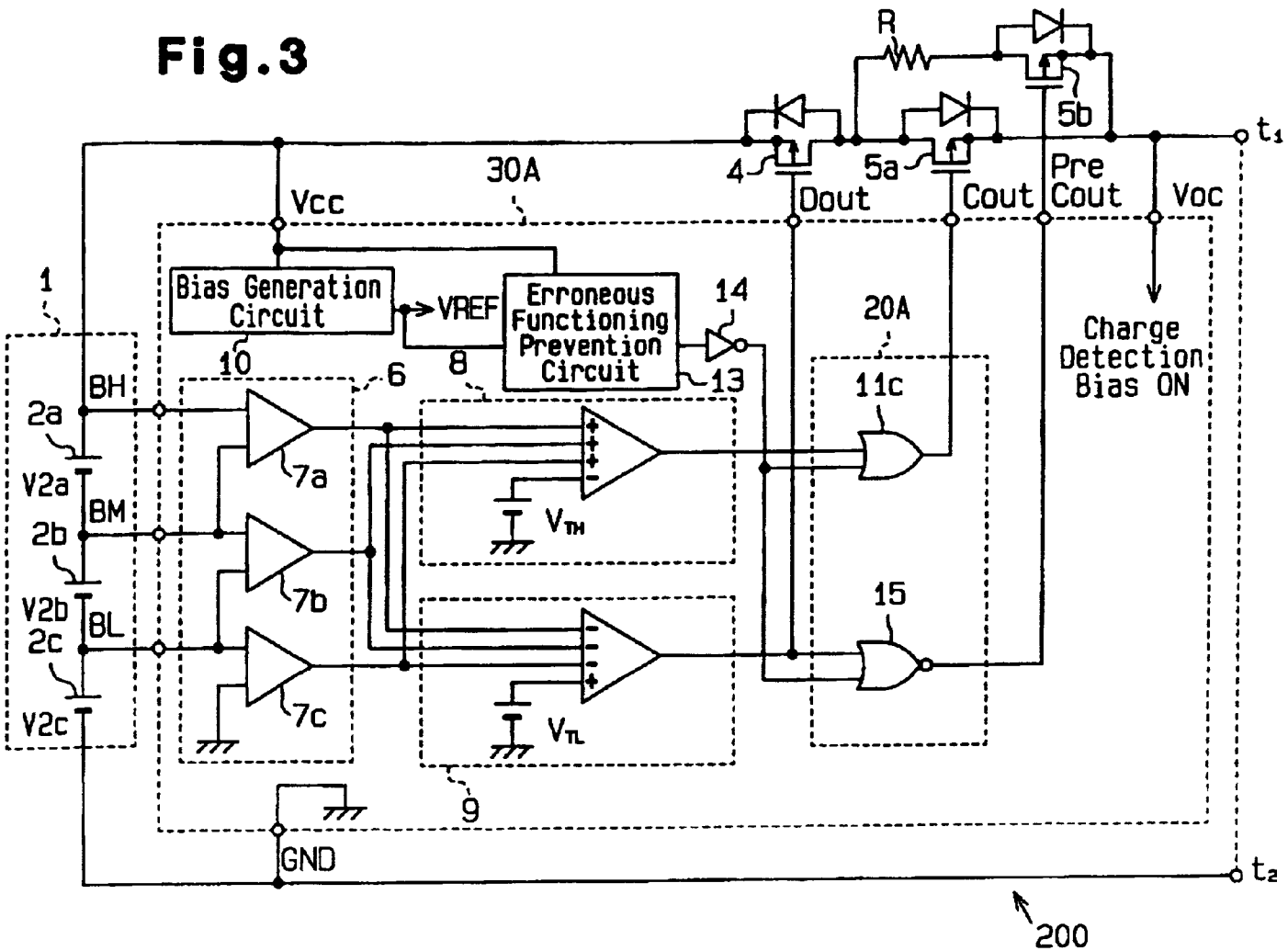
FIG. 3 is a schematic circuit diagram of a charge/discharge control circuit according to a second embodiment of the present invention.

FIG. 3 is a schematic circuit diagram of a charge/discharge control circuit 200 according to a second embodiment of the present invention. The charge/discharge control circuit 200 makes use some of the components in the charge/discharge control circuit 100 of the first embodiment, as identified by those labeled with identical numerals. The charge/discharge control circuit 200 further includes a control unit 30A that differs from the control unit 30 in the charge/discharge control circuit 100 of the first embodiment.

The control unit 30A in the charge/discharge control circuit 200 includes an erroneous functioning prevention circuit 13, which is connected to a bias generation circuit 10, and an output circuit 20A. The output circuit 20A includes an OR circuit 11c and an NOR circuit 15, and is connected to the erroneous functioning prevention circuit 13 via an inverter 14.

The erroneous functioning prevention circuit 13 has a predetermined threshold voltage Vth3. The erroneous functioning prevention circuit 13 generates an erroneous functioning prevention signal (comparison signal). The erroneous functioning prevention signal goes high when any one of the cells 2a, 2b, 2c is overdischarged and the power supply voltage (battery voltage) Vcc is higher than the threshold voltage Vth3. The erroneous functioning prevention signal goes low when the battery voltage Vcc is lower than the threshold voltage Vth3.

The erroneous functioning prevention signal is provided to and further inverted by the inverter 14. The inverted erroneous functioning prevention signal is provided to first input terminals of the OR circuit 11c and the NOR circuit 15 in the output circuit 20A. The first and second charge control switches 5a, 5b are controlled based on the erroneous functioning prevention signal.

The output signal of the overcharge detection circuit 8 is provided to a second input terminal of the OR circuit 11c. The output signal Dout of the overdischarge detection circuit 9 is provided to the discharge control switch 4 and a second input terminal of the NOR circuit 15. The output signal (first charge control signal) Cout of the OR circuit 11c is provided to the first charge control switch 5a. The output signal (second charge control signal) PreCout of the NOR circuit 15 is provided to the second charge control switch 5b.

The operation of the charge/discharge control circuit 200 of the second embodiment will now be discussed.

In an overdischarged state, the erroneous functioning prevention circuit 13 provides the inverter 14 with a high erroneous functioning prevention signal. The inverter 14 inverts the high erroneous functioning signal and thereby causes the erroneous functioning signal to go low. The low erroneous functioning prevention signal is then provided to the OR circuit 11c and the NOR circuit 15. The output signal of the overcharge detection circuit 8 goes high, and the output signal Dout from the overdischarge detection circuit 9 goes low.

As a result, the first charge control signal Cout provided by the OR circuit 11c to the first charge control switch 5a goes high, and the second charge control signal PreCout provided by the NOR circuit 15 to the second charge control switch 5b goes high. This causes both of the first and second charge control switches 5a, 5b to be deactivated. In this state, the discharge control switch 4 is activated. Hence, charging is prohibited and discharging is performed.

In a normal state, the erroneous functioning prevention signal output by the erroneous functioning prevention circuit 13 is high. The signals output by the overcharge detection circuit 8 and the overdischarge detection circuit 9 are both low. In this state, the discharge control switch 4 and the first discharge control switch 5a are activated. Thus, discharging or charging (constant current charging) is performed.

In an overdischarged state, the signal output by the overcharge detection circuit 8 is low, and the signal output by the overdischarge detection circuit 9 is high. A high discharge control signal Dout deactivates the discharge control switch 4. Hence, discharging is prohibited.

As a way of example, if the threshold voltage Vth3 is set at 4V, the discharge reference voltage VTL is set at 2.5V, and each of the cell voltages is 1V, the power supply voltage Vcc is 3V. Since this power supply voltage (3V) is lower than the threshold voltage Vth3 (4V), the erroneous functioning prevention signal generated by the erroneous functioning prevention circuit 13 is low. This low erroneous functioning prevention signal is provided to the inverter 14.

The inverter 14 inverts the low erroneous functioning signal and thereby causes the erroneous functioning prevention signal to go high. The high erroneous functioning prevention signal is then provided to the OR circuit 11c and the NOR circuit 15. As a result, the first charge control signal Cout generated by the OR circuit 11c goes high, and the second charge control signal PreCout generated by the NOR circuit 15 goes low. Thus, only the second charge control switch 5b is activated. Accordingly, charging is performed with a charging current flowing through the resistor R. Thus, constant voltage charging is performed.

If the threshold voltage Vth3 is set at 4V, the discharge reference voltage VTL is set at 2.5V, and each of the cell voltages is 2V, the power supply voltage Vcc is 6V. Since this power supply voltage (6V) is higher than the threshold voltage Vth3 (4V), the erroneous functioning prevention signal generated by the erroneous functioning prevention circuit 13 is high. The high erroneous functioning prevention signal is then provided to the inverter 14. In this state, the first charge control signal Cout generated by the OR circuit 11c and the second charge control signal PreCout generated by the NOR circuit 15 are both low. Hence, both of the first and second charge control switches 5a, 5b are activated.

Charging in this state is performed with a charging current flowing through the first charge control switch 5a that has a low impedance. Thus, constant current charging is performed, regardless of the overdischarged state.

The charge/discharge control circuit 120 of the second embodiment has the advantages described as follows.

(1) In an overdischarged state, the erroneous functioning prevention circuit 13 simultaneously activates the first and second charge control switches 5a, 5b. This prevents momentary deactivation of the first and second charge control switches 5a, 5b when switching from constant voltage charging to constant current charging. Thus, the charging voltage does not increase.

(2) In an overdischarged state, unless the power supply voltage Vcc is extremely close to 0V, constant current charging may be performed by the first charge control switch 5a. In other words, even in an overdischarged state, the first charge control switch 5a is allowed to perform constant current charging so long as the charging voltage is high enough to prevent heating of the first charge control switch 5a. Accordingly, charging is performed within a short time period without heating the control switches.

(3) By changing the threshold voltage Vth3 of the erroneous functioning prevention circuit 13, the switching of the first and second charge control switches 5a, 5b may be controlled as desired.

[Third Embodiment]

Figure 4:
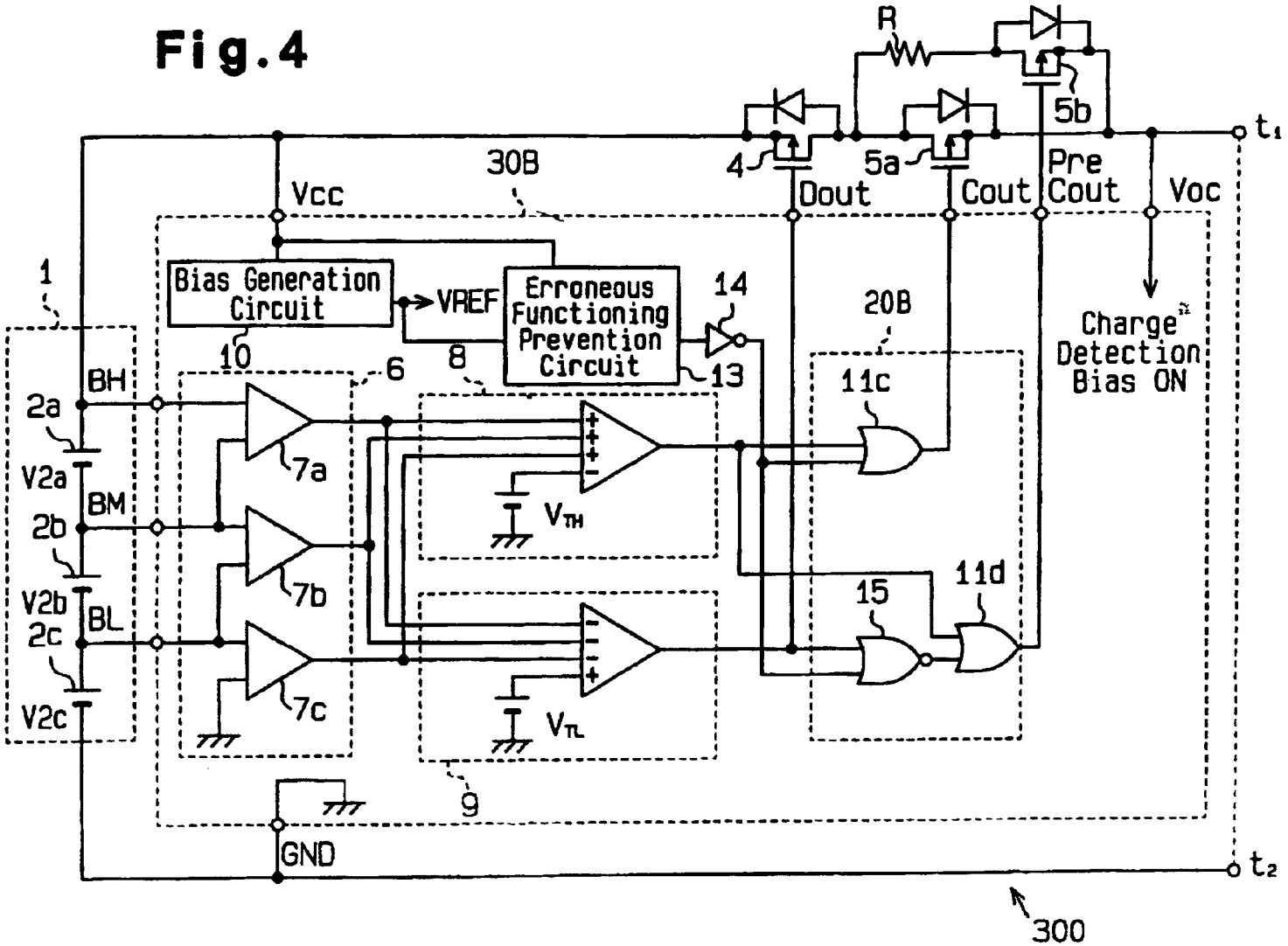
FIG. 4 is a schematic circuit diagram of a charge/discharge control circuit according to a third embodiment of the present invention.

FIG. 4 is a schematic circuit diagram of a charge/discharge control circuit 300 according to a third embodiment of the present invention. The charge/discharge control circuit 300 makes use some of the components in the charge/discharge control circuit 200 of the second embodiment, as identified by those labeled with identical numerals. The charge/discharge control circuit 300 includes an output circuit 20B, which is configured by adding an OR circuit 11d to the output circuit 20A incorporated in the charge/discharge control circuit 200 of the second embodiment.

The OR circuit 11d is connected to the NOR circuit 15 and the overcharge detection circuit 8. That is, the output signal of the overcharge detection circuit 8 is provided to a first input terminal of the OR circuit 11d, and the output signal of the NOR circuit 15 is provided to a second input terminal of the OR circuit 11d. The OR circuit 11d generates and provides the second charge control signal PreCout to the second charge control switch 5b.

The operation of the charge/discharge control circuit 300 of the third embodiment will now be discussed.

In a normal state or an overdischarged state, the charge/discharge control circuit 300 functions in the same manner as the charge/discharge control circuit 200 of the second embodiment.

When any one of the cells 2a, 2b, 2c is in an overcharged state, the output signal of the overcharge detection circuit 8 is high. This high output signal is provided to the OR circuits 11c, 11d. Consequently, the output signal Cout of the OR circuit 11c is high and provided to the first charge control switch 5a. The output signal PreCout of the OR circuit 11d is high and provided to the second charge control switch 5b. Thus, the first and second charge control switches 5a, 5b are both deactivated.

The charge/discharge control circuit 300 of the third embodiment provides the same advantages as the charge/discharge control circuit 100 of the first embodiment, or the charge/discharge control circuit 200 of the second embodiment, as described above.

It should be apparent to those skilled in the art that the present invention may be embodied in many other alternative forms without departing from the principle and the scope of the invention. Particularly, it should be understood that the present invention may be embodied in the following forms.

The output circuits 20, 20A, 20B in FIGS. 2–4 are not limited to those exemplary configurations illustrated in the above embodiments. In other words, these output circuits may be altered as desired, so long as the predetermined first and second charge control signals Cout, PreCout are provided.

The present examples and embodiments are to be considered as illustrative and not restrictive, and the invention is not to be limited to the details given herein, but may be modified within the scope and equivalence of the appended claims.

What is claimed is:

1. A charge/discharge control circuit for controlling charging and discharging of a secondary battery, wherein the secondary battery includes a cell, the control circuit comprising:

an overdischarge detection circuit for comparing a voltage of the cell with a predetermined discharge reference voltage, determining whether the secondary battery is in an overdischarged state, and generating an overdischarge determination signal;

an overcharge detection circuit for comparing the voltage of the cell with a predetermined charge reference voltage, determining whether the secondary battery is in an overcharged state, and generating an overcharge determination signal;

a discharge control switch connected to the overdischarge detection circuit and deactivated in the overdischarged state based on the overdischarge determination signal;

a first charge control switch deactivated in the overdischarged state based on the overdischarge determination signal and the overcharge determination signal;

a second charge control switch activated in the overdischarged state based on the overdischarge determination signal and the overcharge determination signal; and a current-limiting circuit connected in series with the second charge control switch for limiting a charging current when charging is performed.

2. The charge/discharge control circuit according to claim 1, further comprising:

an output circuit connected to the overdischarge detection circuit and the overcharge detection circuit for receiving the overdischarge determination signal and the overcharge determination signal and generating first and second control signals to control activation and deactivation of the first and second control switches.

3. The charge/discharge control circuit according to claim 2, wherein the output circuit generates the first and second control signals so as to deactivate the first and second charge control switches when the cell is overcharged, wherein the output circuit generates the first and second control signals so as to activate at least the second charge control switch when the cell is overdischarged, and wherein the output circuit generates the first and second control signals so as to activate only the first charge control switch when the cell is neither overcharged nor overdischarged.

4. The charge/discharge control circuit according to claim 1, wherein the second charge control switch is connected in parallel with the first charge control switch.

5. The charge/discharge control circuit according to claim 1, wherein the current-limiting circuit includes a resistor having a resistance set such that a voltage drop across the resistor is greater than a predetermined target charging voltage when performing charging in the overdischarged state.

6. The charge/discharge control circuit according to claim 1, wherein a constant voltage charging is performed by the current-limiting circuit and the second charge control switch when the second charge control switch is activated, and a target charging voltage for the constant voltage charging is substantially equal to the voltage between a source and gate of the second charge control switch.

7. A charge/discharge control circuit for controlling charging and discharging of a secondary battery, wherein the secondary battery includes a cell, the control circuit comprising:

an overdischarge detection circuit for comparing a voltage of the cell with a predetermined discharge reference voltage, determining whether the secondary battery is in an overdischarged state, and generating an overdischarge determination signal;

an overcharge detection circuit for comparing the voltage of the cell with a predetermined charge reference voltage, determining whether the secondary battery is in an overcharged state, and generating an overcharge determination signal;

a discharge control switch connected to the overdischarge detection circuit and deactivated in the overdischarged state based on the overdischarge determination signal;

a first charge control switch deactivated in the overdischarged state based on the overdischarge determination signal and the overcharge determination signal;

a second charge control switch activated in the overdischarged state based on the overdischarge determination signal and the overcharge determination signal;

a current-limiting circuit connected in series with the second charge control switch for limiting a charging current when charging is performed; and an erroneous functioning prevention circuit for controlling activation and deactivation of the first charge control switch in the overdischarged state based on a level of a voltage supplied by the secondary battery.

8. The charge/discharge control circuit according to claim 7, wherein the erroneous functioning prevention circuit has a threshold voltage, and wherein the erroneous functioning prevention circuit compares the voltage of the second battery to the threshold voltage, generates a comparison signal, and controls the activation and deactivation of the first charge control switch based on the comparison signal.

9. The charge/discharge control circuit according to claim 8, wherein the threshold voltage of the erroneous functioning circuit is variable.

10. The charge/discharge control circuit according to claim 7, further comprising:

an output circuit connected to the overdischarge detection circuit, the overcharge detection circuit and the erroneous functioning prevention circuit, for receiving the overdischarge determination signal, the overcharge determination signal, and the comparison signal and generating first and second control signals to control the activation and deactivation of the first and second control switches.

11. The charge/discharge control circuit according to claim 10, wherein the output circuit generates the first and second control signals so as to deactivate the first and second charge control switches when the cell is overcharged, wherein the output circuit generates the first and second control signals so as to activate at least the second charge control switch when the cell is overdischarged, and wherein the output circuit generates the first and second control signals so as to activate only the first charge control switch when the cell is neither overcharged nor overdischarged.

12. The charge/discharge control circuit according to claim 7, wherein the second charge control switch is connected in parallel with the first charge control switch.

13. The charge/discharge control circuit according to claim 7, wherein the current-limiting circuit includes a resistor having a resistance set such that a voltage drop across the resistor is greater than a predetermined target charging voltage when performing charging in the overdischarged stage.

14. The charge/discharge control circuit according to claim 7, wherein a constant voltage charging is performed by the current limiting circuit and the second charge control switch when the second control switch is activated, and a target charging voltage for the constant voltage charging is substantially equal to the voltage between a source and gate of the second charge control switch.

15. A secondary battery including:

a cell; and a charge/discharge control circuit connected to the cell for controlling charging and discharging of the cell, the charge/discharge control circuit comprising:

an overdischarge detection circuit for comparing a voltage of the cell with a predetermined discharge reference voltage, determining whether the secondary battery is in an overdischarged state, and generating an overdischarge determination signal;

an overcharge detection circuit for comparing the voltage of the cell with a predetermined charge reference voltage, determining whether the secondary battery is in an overcharged state, and generating an overcharge determination signal;

a discharge control switch connected to the overdischarge detection circuit and deactivated in the overdischarged state based on the overdischarge determination signal;

a first charge control switch deactivated in the overdischarged state based on the overdischarge determination signal and the overcharge determination signal;

a second charge control switch activated in the overdischarged state based on the overdischarge determination signal and the overcharge determination signal; and a current-limiting circuit connected in series with the second charge control switch for limiting a charging current when charging is performed.

16. The secondary battery according to claim 15, wherein the charge/discharge control circuit further includes:

an erroneous functioning prevention circuit for controlling activation and deactivation of the first charge control switch in the overdischarged state based on a level of a voltage supplied by the secondary battery.

*17. A charge/discharge control circuit for charging a secondary battery via first and second charge paths connected in parallel and for discharging the secondary battery, the first charge path comprising a first charge control switch, and the second charge path comprising a second charge control switch and bypassing the first charge path, wherein the conductance of the first charge path is higher than that of the second charge path, and wherein the secondary battery includes a cell, the control circuit comprising:*

*an overdischarge detection circuit for determining that the secondary battery is in an overdischarged state by comparing a voltage of the cell with a predetermined discharge reference voltage to generate an overdischarge determination signal which deactivates the first charge control switch and activates the second charge control switch.*

*18. The charge/discharge control circuit according to claim 17, further comprising an output circuit connected to the overdischarge detection circuit for receiving the overdischarge determination signal and generating first and second control signals to control the activation and deactivation of the first and second control switches.*

*19. The charge/discharge control circuit according to claim 18, wherein the output circuit generates the first and second control signals to activate at least the second charge control switch when the cell is overdischarged.*

*20. The charge/discharge control circuit according to claim 17, further comprising a current-limiting circuit connected in series to the second charge control switch for limiting charging current when charging is performed, wherein the current-limiting circuit includes a resistor having a resistance set so that a voltage drop at the resistor is greater than a predetermined target charging voltage when performing charging in the overdischarged state.*

*21. The charge/discharge control circuit according to claim 17, wherein constant voltage charging is performed by the second charge control switch when the second control switch is activated, and the target charging voltage for the constant voltage charging is substantially equal to the voltage between a source and gate of the second charge control switch.*

*22. A charge/discharge control circuit for charging a secondary battery via first and second charge paths connected in parallel and for discharging the secondary battery, the first charge path comprising a first charge control switch, and the second charge path comprising a second charge control switch and bypassing the first charge path, wherein the conductance of the first charge path is higher than that of the second charge path, and wherein the secondary battery includes a plurality of cells, the control circuit comprising:*

*an overdischarge detection circuit for receiving voltages of the plurality of cells and determining that the secondary battery is in an overdischarged state when one of the voltages of the plurality of cells is lower than a predetermined discharge reference voltage to generate an overdischarge determination signal, in the overdischarge determination signal, in the overdischarged state, which deactivates the first charge control switch and activates the second charge control switch.*

*23. The charge/discharge control circuit according to claim 22, further comprising an output circuit connected to the overdischarged detection circuit for receiving the overdischarge determination signal and generating first and second control signals to control the activation and deactivation of the first and second control switches.*

*24. The charge/discharge control circuit according to claim 23, wherein the output circuit generates the first and second control signals to activate at least the second charge control switch when the cell is overdischarged.*

*25. The charge/discharge control circuit according to claim 22, further comprising a current-limiting circuit connected in series to the second charge control switch for limiting charging current when charging is performed, wherein the current-limiting circuit includes a resistor having a resistance set so that a voltage drop at the resistor is greater than a predetermined target charging voltage when performing charging in the overdischarged state.*

*26. The charge/discharge control circuit according to claim 22, wherein constant voltage charging is performed by the second charge control switch when the second control switch is activated, and a target charging voltage for the constant voltage charging is substantially equal to the voltage between a source and gate of the second charge control switch.*

* * * * *